(12) United States Patent
Kim et al.

(10) Patent No.: US 8,906,557 B2
(45) Date of Patent: *Dec. 9, 2014

(54) ANODE ACTIVE MATERIAL AND METHOD OF PREPARING THE SAME

(75) Inventors: Gue-sung Kim, Yongin-si (KR); Yong-nam Ham, Yongin-si (KR); Han-su Kim, Yongin-si (KR); Dong-min Im, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 494 days.

This patent is subject to a terminal disclaimer.

(21) Appl. No.: 11/689,941

(22) Filed: Mar. 22, 2007

(65) Prior Publication Data
US 2007/0243469 A1    Oct. 18, 2007

(30) Foreign Application Priority Data

Apr. 17, 2006   (KR) ................. 10-2006-0034671

(51) Int. Cl.
| | |
|---|---|
| *H01B 1/02* | (2006.01) |
| *H01M 4/38* | (2006.01) |
| *H01M 4/134* | (2010.01) |
| *H01M 4/04* | (2006.01) |
| *H01M 4/36* | (2006.01) |
| *H01M 10/052* | (2010.01) |
| *H01M 4/133* | (2010.01) |
| *H01M 4/62* | (2006.01) |
| *H01M 4/02* | (2006.01) |

(52) U.S. Cl.
CPC .............. *H01M 10/052* (2013.01); *H01M 4/38* (2013.01); *Y02E 60/122* (2013.01); *H01M 4/134* (2013.01); *H01M 4/0471* (2013.01); *H01M 4/364* (2013.01); *H01M 2004/021* (2013.01); *H01M 4/133* (2013.01); *H01M 4/626* (2013.01); *H01M 4/625* (2013.01)

USPC .................. 429/232; 429/231.1; 429/231.2; 429/231.3; 429/223; 429/224; 429/623.5; 429/218.1; 429/218.2; 252/182.1; 252/504; 252/506; 252/507

(58) Field of Classification Search
USPC ............. 429/218.1, 218.2, 223, 231.1, 231.2, 429/231.3, 224, 623.5; 252/182.1, 504, 252/506, 507
IPC .............................. H01M 4/48,4/58, 4/62, 4/36
See application file for complete search history.

(56) References Cited

U.S. PATENT DOCUMENTS 4,083,719 A * 4/1978 Arakawa et al. ................. 75/229
4,410,607 A   10/1983 Arons et al.

(Continued)

FOREIGN PATENT DOCUMENTS

| CN | 1265232 A | 8/2000 |
|---|---|---|
| CN | 1428880 | 7/2003 |

(Continued)

OTHER PUBLICATIONS

Chen et al, Electrochemical Insertion/extraction of lithium in multiwall carbon nanotube/Sb and SnSb0.5 nanocomposite, Dspace@MIT, Molecular Engineering of Biological and Chemical Systems, 2003.*
English translation of KR1998023035.*

(Continued)

*Primary Examiner* — Jun Li
(74) *Attorney, Agent, or Firm* — Christie, Parker & Hale, LLP (57) ABSTRACT

Anode active materials and methods of preparing the same are provided. One anode active material includes a carbonaceous material capable of improving battery cycle characteristics. The carbonaceous material bonds to and coats metal active material particles and fibrous metallic particles to suppress volumetric changes.

19 Claims, 4 Drawing Sheets

(56) References Cited

U.S. PATENT DOCUMENTS

| | | | |
|---|---|---|---|
| 5,080,963 A | | 1/1992 | Tatarchuk et al. |
| 5,531,943 A | * | 7/1996 | Sudani et al. ............... 264/29.1 |
| 5,888,430 A | | 3/1999 | Wakayama |
| 6,432,579 B1 | | 8/2002 | Tsuji et al. |
| 6,558,841 B1 | * | 5/2003 | Nakagiri et al. ........... 429/218.1 |
| 6,638,662 B2 | | 10/2003 | Kaneda et al. |
| 6,916,434 B2 | * | 7/2005 | Nishino et al. ................ 252/503 |
| 8,105,718 B2 | | 1/2012 | Nakanishi et al. |
| 2002/0168574 A1 | * | 11/2002 | Ahn et al. ..................... 429/232 |
| 2003/0008212 A1 | | 1/2003 | Akashi et al. |
| 2003/0049529 A1 | | 3/2003 | Cho et al. |
| 2003/0053945 A1 | | 3/2003 | Fukuoka et al. |
| 2003/0129497 A1 | | 7/2003 | Yamamoto et al. |
| 2004/0033419 A1 | | 2/2004 | Funabiki |
| 2004/0121236 A1 | | 6/2004 | Shen et al. |
| 2005/0058589 A1 | | 3/2005 | Lundquist et al. |
| 2005/0118500 A1 | | 6/2005 | Yata et al. |
| 2005/0233213 A1 | | 10/2005 | Lee et al. |
| 2006/0018822 A1 | | 1/2006 | Okamoto |
| 2006/0087799 A1 | * | 4/2006 | Kosuda et al. ................ 361/516 |
| 2006/0166098 A1 | | 7/2006 | Tabuchi et al. |
| 2007/0258879 A1 | | 11/2007 | Karles et al. |
| 2012/0189913 A1 | | 7/2012 | Wakizaka et al. |

FOREIGN PATENT DOCUMENTS

| | | |
|---|---|---|
| CN | 1507092 A | 6/2004 |
| CN | 1559092 A | 12/2004 |
| CN | 1567617 A | 1/2005 |
| JP | 06-318454 | 11/1994 |
| JP | 09-249407 | 9/1997 |
| JP | 11-273675 | 10/1999 |
| JP | 2000-243395 | 9/2000 |
| JP | 2001-196065 | 7/2001 |
| JP | 2001-283848 | 10/2001 |
| JP | 2002-008652 | 1/2002 |
| JP | 2002-042806 | 2/2002 |
| JP | 2002-201360 | 7/2002 |
| JP | 2002-260637 | 9/2002 |
| JP | 2002-260651 | 9/2002 |
| JP | 2002-373653 | 12/2002 |
| JP | 2003-160328 | 6/2003 |
| JP | 2003-192327 | 7/2003 |
| JP | 2003-197191 | 7/2003 |
| JP | 2003-346803 | 12/2003 |
| JP | 2004-158205 | 6/2004 |
| JP | 2005-093984 | 4/2005 |
| JP | 2005-123175 | 5/2005 |
| JP | 2005-135925 | 5/2005 |
| JP | 2005-158721 | 6/2005 |
| JP | 2006-036576 | 2/2006 |
| KR | 10-1998-0023035 | 7/1998 |
| KR | 2001-0105622 | 11/2001 |
| KR | 10-2004-0096276 | 11/2004 |
| KR | 10-2006-0024325 | 3/2006 |
| WO | WO 99/00001 A3 | 1/1999 |
| WO | WO 03/096449 | 11/2003 |

OTHER PUBLICATIONS

Patent Abstracts of Japan, Publication Number: 2001-196065; Publication Date: Jul. 19, 2001; in the name of Ujiie Yasuharu.

Patent Abstracts of Japan, Publication Number: 2004-158205; Publication Date: Jun. 3, 2004; in the name of Sasaki Jo.

Korean Patent Abstracts, Publication Number: 1020010105622 A; Publication Date: Nov. 29, 2001; in the name of Wan Uk Choi, et al.

Korean Patent Abstracts, Publication Number: 1020040096276 A; Publication Date: Nov. 16, 2004; in the name of Ji Yeong Kim, et al.

U.S. Office action dated Jan. 31, 2011, for cross reference U.S. Appl. No. 11/829,787, noting listed references in this IDS.

SIPO Registration Determination Certificate dated May 19, 2010, for corresponding Chinese Patent application 200710001650.8, noting listed references in this IDS.

Barrett, E.P., et al., *The Determination of Pore Volume and Area Distributions in Porous Substances. I. Computations from Nitrogen Isotherms*, Journal Am. Chem. Society, vol. 73, Jan. 1951, pp. 373-380.

English machine translation of Japanese Patent 06-318454 listed above.

SIPO Patent Publication dated Oct. 7, 2009, for corresponding Chinese Patent application 200510064093.5.

Patent Abstracts of Japan, and English machine translation of Japanese Publication 2000-243395, listed above, 9 pages.

Patent Abstracts of Japan, and English machine translation of Japanese Publication 2002-373653, listed above, 8 pages.

U.S. Office action dated Jan. 8, 2009, for cross reference U.S. Appl. No. 11/077,377.

U.S. Office action dated Jan. 22, 2010, for cross reference U.S. Appl. No. 11/077,377.

U.S. Office action dated Aug. 3, 2010, for cross reference U.S. Appl. No. 11/077,377.

Japanese Office action dated May 29, 2012, for corresponding Japanese Patent application 2007-058912, (2 pages).

Patent Abstracts of Japan, and English machine translation of Japanese Publication 2005-135925 listed above, (46 pages).

Patent Abstracts of Japan, and English machine translation of Japanese Publication 2005-158721 listed above, (45 pages).

KIPO Notice of Allowance, dated Feb. 12, 2008, for Korean Patent application 10-2006-0130375, 4 pages.

Patent Abstracts of Japan, and English machine translation of Japanese Publication 2002-201360 listed above, 41 pages.

U.S. Office action dated Jan. 14, 2011, for cross-reference U.S. Appl. No. 11/077,377, 17 pages.

U.S. Notice of Allowance dated Jul. 22, 2011, for cross-reference U.S. Appl. No. 11/829,787, 11 pages.

KIPO Office action dated Jan. 14, 2013, for Korean priority Patent application 10-2006-0034671, ) (6 pages).

Patent Abstracts of Japan, and English machine translation for Japanese Publication 2005-123175 listed above, (37 pages).

U.S. Office action dated Apr. 11, 2013, for cross reference U.S. Appl. No. 11/077,377, (22 pages).

U.S. Notice of Allowance dated Jun. 19, 2013, for cross reference U.S. Appl. No. 13/243,039, (16 pages).

U.S. Office action dated Aug. 7, 2013, for cross reference U.S. Appl. No. 11/077,377, (19 pages).

KIPO Notice of Allowance dated Oct. 8, 2013, for Korean priority Patent application 10-2006-0034671, (6 pages).

* cited by examiner

ANODE ACTIVE MATERIAL AND METHOD OF PREPARING THE SAME

CROSS-REFERENCE TO RELATED PATENT APPLICATION

This application claims priority to and the benefit of Korean Patent Application No. 10-2006-0034671, filed on Apr. 17, 2006 in the Korean Intellectual Property Office, the entire content of which is incorporated herein by reference.

BACKGROUND OF THE INVENTION

1. Field of the Invention

The present invention relates to anode (negative electrode) active materials and methods of preparing the same. More particularly, the invention relates to anode active materials comprising carbonaceous materials.

2. Description of the Related Art

Non-aqueous electrolyte secondary batteries using lithium compounds as anodes have been intensively researched and developed in an effort to obtain high voltages and high energy densities. Specifically, in the early stages of the research and development metallic lithium was intensively researched because of its high battery capacity, yielding much attention for lithium as the most prominent anode material. However, when metallic lithium is used as an anode material, a large amount of lithium is deposited on the surface of the anode in the form of dendrites. This may degrade charging and discharging efficiencies or cause internal-shorts between the anode and the cathode (positive electrode). Further, lithium is very sensitive to heat and impact and is prone to explosion due to its instability (i.e., high reactivity). This has delayed commercialization. In order to address these problems, carbonaceous materials have been proposed for use as anode materials. Carbonaceous anodes perform redox reactions enabling lithium ions in the electrolytic solution to intercalate and deintercalate into and out of the carbonaceous anode. The carbonaceous material of the anode does not include lithium metal and may have a crystal lattice structure during charge and discharge cycles, which is referred to as a "rocking chair type" anode.

Carbonaceous anodes have greatly contributed to the widespread use of lithium batteries by overcoming various disadvantages associated with metallic lithium. However, as electronic devices become smaller and lighter, and use of portable electronic instruments increases, development of lithium secondary batteries having higher capacities becomes a major focal point. Lithium batteries using carbonaceous anodes basically have low battery capacities because of the porosity of the carbonaceous anode. For example, when made into a $LiC_6$ alloy by reaction with lithium ions, graphite (an ultra-high crystalline material) has a theoretical capacity of about 372 mAh/g. This is only about 10% that of metallic lithium, i.e., 3860 mAh/g. Thus, in spite of the many problems with conventional metallic lithium anodes, studies on the improvement of battery capacities of batteries using metallic lithium anode materials are still actively being conducted.

Lithium-containing alloys such as lithium-aluminum, lithium-lead, lithium-tin, or lithium-silicon have higher electrical capacities than carbonaceous materials. However, when such an alloy of two or more metals or a single metal is used, formation of lithium dendrites may cause several problems, e.g., short-circuiting of the battery.

Accordingly, various studies on solutions to these problems and on enhancing the electric capacities of batteries by mixing the lithium-containing alloys with carbonaceous materials have been undertaken. However, differences in volumetric expansion between metallic materials and carbonaceous materials may cause the metallic material to react with the electrolyte. During charge cycles, lithium ions used as the anode material are inserted into the anode. When this happens, the overall volume of the anode expands, leading to a compact anode structure. During discharge cycles, lithium is deintercalated from the anode to an ionic state, resulting in a reduction in the volume of the anode material. Since the metallic material and the carbonaceous material have different expansion coefficients, empty spaces may be created in the anode structure when the anode material shrinks. This causes electrical isolation in the openings formed in the empty spaces, thereby disabling smooth mobility of electrons and deteriorating the lifespan of the battery.

SUMMARY OF THE INVENTION

In one embodiment of the present invention, an anode active material is capable of improving battery cycle characteristics when included in a battery.

In another embodiment of the present invention, a method of preparing the anode active material is provided.

In yet another embodiment of the present invention, an anode employs the anode active material.

In still another embodiment of the present invention, a lithium battery includes the anode active material. In one embodiment, the lithium battery has improved initial efficiency. In another embodiment, the lithium battery has improved charge and discharge capacity.

According to an embodiment of the present invention, an anode active material includes metal active material particles, fibrous metallic particles, and a carbonaceous material coated on and bonded to the metal active material particles and the fibrous metallic particles.

In another embodiment of the present invention, the aspect ratio of the fibrous metallic particles ranges from about 1:2 to about 1:200.

In still another embodiment of the present invention, the specific resistance of the fibrous metallic particles is less than about $20 \times 10^{-8}$ Ωm.

In a further embodiment of the present invention, the fibrous metallic particles have an average particle diameter of less than 1000 nm.

In yet another embodiment of the present invention, the metal active material particles comprise at least one metal selected from Si, Sn, Al, Ge, Pb, Bi, Sb, and combinations thereof.

In a still further embodiment of the present invention, the fibrous metallic particles include a metal, a metal alloy, or a metal-carbon composite material.

According to another embodiment of the present invention, a method of preparing an anode active material includes mixing a metal active material powder, fibrous metallic particles and a carbonaceous material precursor to yield a mixture. The method further includes pulverizing the resulting mixture, and calcining the pulverized mixture.

In another embodiment of the present invention, the carbonaceous material precursor comprises at least one resin selected from vinyl-based resins, phenol-based resins, cellulose-based resins, pitch-based resins, and tar-based resins.

In still another embodiment of the present invention, the pulverizing the resulting mixture includes using a pulverizing technique selected from high-energy milling, mechano-fusion, ball milling, hammer milling, and combinations thereof.

In a further embodiment of the present invention, the calcining the pulverized mixture includes treating the mixture at a calcination temperature ranging from about 500 to about 1400° C.

In yet another embodiment of the present invention, the mixing ratio of the reactant materials is adjusted such that the fibrous metallic particles are present in an amount ranging from about 0.01 to about 20 parts by weight, and the carbonaceous precursor is present in amount ranging from 0.1 to about 20 parts by weight based on the total weight of the metal active material powder.

According to still another embodiment of the present invention, an anode electrode comprises the anode active material.

According to a further embodiment of the present invention, a lithium battery comprises the anode electrode.

BRIEF DESCRIPTION OF THE DRAWINGS

The above and other features and advantages of the present invention will become more apparent by reference to the following detailed description when considered in conjunction with the attached drawings in which.

DETAILED DESCRIPTION

The invention will now be described with reference to the accompanying drawings, in which exemplary embodiments of the invention are shown.

Metal active materials, when used as high-capacity anode active materials, tend to weaken charge and discharge characteristics of batteries due to sharp volumetric changes in the metal. In particular, when a carbonaceous material is coated on a metal surface in a battery, the carbonaceous coating may be damaged due to repetitive charging and discharging of the battery. This causes electrical short-circuits and disables the reversible charging and discharging operations of lithium ions in the battery. In one embodiment of the present invention, an anode active material comprises metal active material particles and fibrous metallic particles bonded to each other by a carbonaceous material. According to this embodiment, volumetric changes in the active material particles during charge-discharge cycles are effectively suppressed by the electric conductivity of the carbonaceous material and the electrical connection of the active material particles by the fibrous metallic particles. Therefore, this embodiment of the present invention improves initial efficiencies and charge-discharge capacities by suppressing volumetric changes in the anode active material and avoiding electrode deterioration.

As used herein, the term "fibrous metallic particles" encompasses conductive metallic particles having average particle diameters on a nanometer scale and a relatively large aspect ratio, irrespective of preparation methods. Accordingly, nonlimiting examples of suitable fibrous metallic particles include nanorods and nanotubes. However, any electrically conductive material can be used as the fibrous metallic particles. For example, suitable materials for use as the fibrous metallic particles include metals, metal alloys, and metal-carbon composite materials. Nonlimiting examples of suitable materials for use as the fibrous metallic particles include Co, Ni, Cu, Ag, Pt, Mg, Au, Ti, Fe, Zn, Mo, W, Mn, Cr, Al, Sn, Pb and combinations thereof.

In one embodiment of the present invention, the metal active material particles include metals capable of alloying with lithium. Nonlimiting examples of suitable materials for use as the metal active material particles include Si, Sn, Al, Ge, Pb, Bi, Sb, and combinations thereof. However, it is understood that all possible metals known in the art may be used.

In another embodiment of the present invention, the aspect ratio of the fibrous metallic particles ranges from about 1:2 to about 1:200. When the aspect ratio is less than about 1:2 or greater than about 1:200, the fibrous metallic particles may exhibit an undesirable loss of connectivity due to volumetric expansion during charge and discharge cycles.

In yet another embodiment of the present invention, the specific resistance of the fibrous metallic particles is less than about $20 \times 10^{-8}$ Ωm. When the specific resistance of the fibrous metallic particles exceeds about $20 \times 10^{-8}$ Ωm, the excess may degrade the electric conductivity of the electrode.

In still another embodiment of the present invention, the fibrous metallic particles have an average particle diameter of less than 1000 nm. When the average particle diameter of the fibrous metallic particles is greater than or equal to 1000 nm, the fibrous metallic particles may exhibit an undesirable loss of connectivity due to volumetric expansion during charge and discharge cycles.

In one embodiment of the anode active material of the present invention, a carbonaceous material is coated on and bonded to the metal active material particles and the fibrous metallic particles. In one embodiment, the carbonaceous material is a product of calcination of a polymeric material. Nonlimiting examples of suitable polymeric materials include vinyl-based resins, phenol-based resins, cellulose-based resins, pitch-based resins, and tar-based resins. However, it is understood that any polymeric material can be used as long as it is can be calcined into a carbonaceous material by heat treatment.

In another embodiment of the present invention, an anode electrode comprises the anode active material. In an exemplary embodiment of the present invention, the anode electrode may be manufactured by forming an anode material mixture including the anode active material and a binder into a shape. Alternatively, the anode electrode may be manufactured by applying the anode material mixture to a current collector made of, for example, copper foil.

Specifically, in one embodiment, an anode electrode is manufactured by preparing an anode active material composition and then directly coating the composition on a copper foil current collector. Alternatively, the active material composition is cast on a separate support to form a film which is then peeled off of the support and laminated on the copper foil. However, it is understood that the anode may be formed by any suitable method.

To attain higher capacity batteries, a large amount of current is required to charge and discharge the higher capacity batteries. This requires a low resistance material to be used as an electrode material. Thus, to reduce the resistance of the electrode, a conducting agent is generally employed. Nonlimiting examples of suitable conducting agents include carbon black and fine graphite particles.

Figure 5:
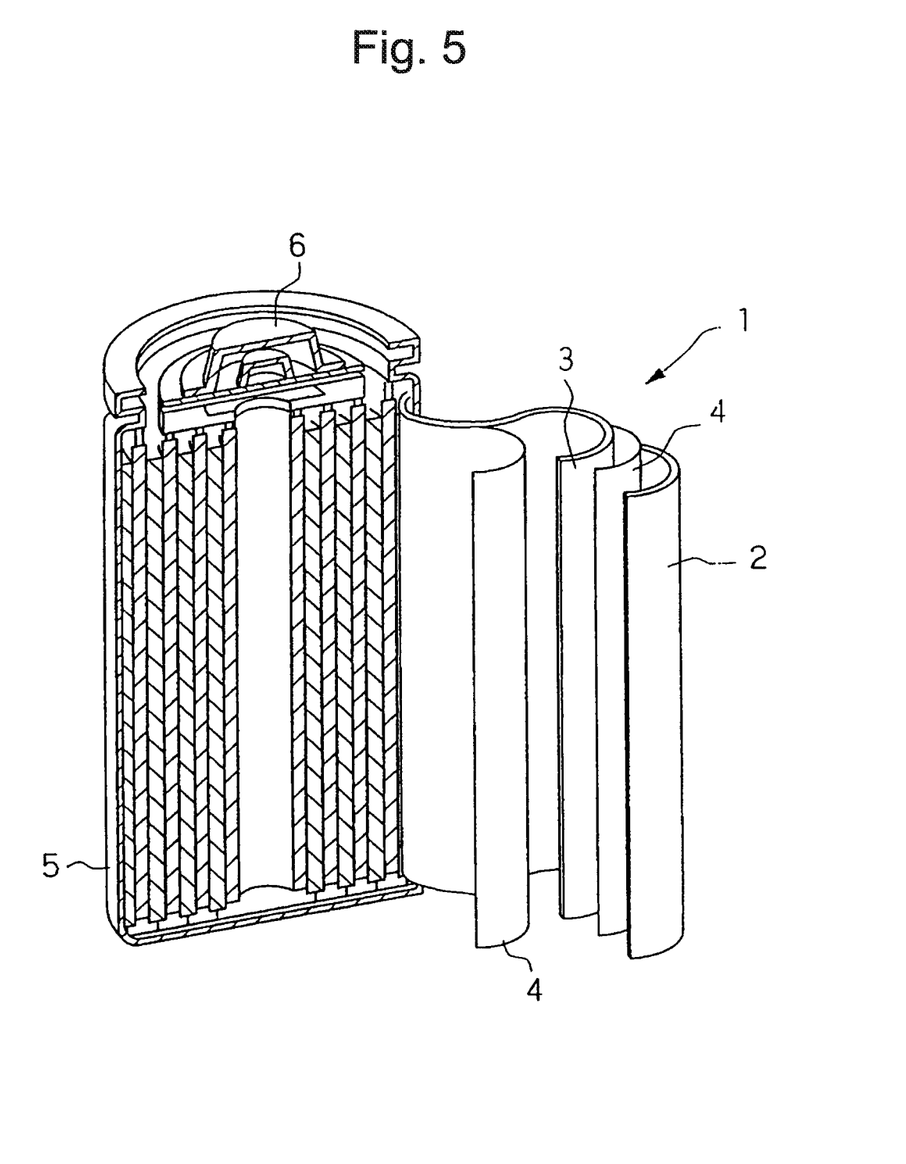
FIG. 5 is a schematic perspective view of a lithium battery according to one embodiment of the present invention.

According to one embodiment of the present invention, as shown in FIG. 5, a lithium battery 1 comprises an electrode assembly including the anode 2, a cathode 3 and a separator 4. The electrode assembly is encased in a battery case 5, sealed with a cap assembly 6 and injected with an electrolytic solution.

According to another embodiment of the present invention, the lithium battery is prepared in the following manner. First, a cathode active material, a conducting agent, a binder, and a solvent are mixed to prepare a cathode active material composition. The cathode active material composition is directly coated on a metallic current collector and dried to prepare a cathode electrode. In an alternative embodiment, the cathode active material composition is cast on a separate support to form a film which is then peeled from the support and laminated on the metallic current collector.

A lithium-containing metal oxide may be used as the cathode electrode active material. Nonlimiting examples of suitable lithium-containing metal oxides include $LiCoO_2$, $LiMn_xO_{2x}$, $LiNi_{1-x}Mn_xO_{2x}$ (x=1, 2), and $Ni_{1-x-y}Co_xMn_yO_2$ ($0 \leq x \leq 0.5$, $0 \leq y \leq 0.5$). Specific, nonlimiting, examples of suitable lithium-containing metal oxides include compounds capable of oxidizing and reducing lithium ions, such as $LiMn_2O_4$, $LiCoO_2$, $LiNiO_2$, $LiFeO_2$, $V_2O_5$, TiS, MoS, and the like.

One nonlimiting example of a suitable conducting agent is carbon black.

Nonlimiting examples of suitable binders include vinylidene fluoride/hexafluoropropylene (HFP) copolymers, polyvinylidene difluoride (PVdF), polyacrylonitrile, polymethylmethacrylate, polytetrafluoroethylene, and mixtures thereof. Other nonlimiting examples of suitable binders include styrene butadiene rubber polymers.

Nonlimiting examples of suitable solvents include N-methyl-pyrrolidone, acetone, water, and the like.

The amounts of the cathode electrode active material, the conducting agent, the binder, and the solvent used in the manufacture of the lithium battery are those amounts generally acceptable in the art.

Any separator commonly used for lithium batteries can be used. In particular, the separator may have low resistance to the migration of ions in an electrolyte and have excellent electrolyte-retaining ability. Nonlimiting examples of suitable separators include glass fibers, polyester, polyethylene, polypropylene, polytetrafluoroethylene (PTFE), and combinations thereof. The separator may comprise a non-woven or woven fabric and may be a material which can be rolled. Nonlimiting examples of suitable separators for use in lithium ion batteries include polyethylene, polypropylene and the like. Nonlimiting examples of suitable separators for use in lithium-ion polymer batteries include materials capable of retaining large amounts of organic electrolytic solution.

A separator may be formed by mixing a polymer resin, a filler, and a solvent to prepare a separator composition. The separator composition is directly coated on the electrode, and then dried to form a separator film. Alternatively, the separator composition can be cast onto a separate support, dried, detached from the separate support, and laminated on the electrode, thereby forming a separator film.

Any polymer resin commonly used in lithium batteries can be used. Nonlimiting examples of suitable polymer resins include vinylidenefluoride/hexafluoropropylene copolymers, polyvinylidenefluoride, polyacrylonitrile, polymethylmethacrylate and mixtures thereof.

Nonlimiting examples of suitable solvents for use in the electrolytic solution include propylene carbonate, ethylene carbonate, diethyl carbonate, ethylmethyl carbonate, methylpropyl carbonate, butylene carbonate, benzonitrile, acetonitrile, tetrahydrofuran, 2-methyltetrahydrofuran, gamma-butyrolactone, dioxolane, 4-methyldioxolane, N,N-dimethyl formamide, dimethyl acetamide, dimethylsulfoxide, dioxane, 1,2-dimethoxyethane, sulfolane, dichloroethane, chlorobenzene, nitrobenzene, dimethyl carbonate, methylethyl carbonate, methylpropyl carbonate, methylisopropyl carbonate, ethylpropyl carbonate, dipropyl carbonate, dibutyl carbonate, diethylene glycol, dimethyl ether, and mixtures thereof.

Nonlimiting examples of suitable electrolytes include lithium salts in electrolyte solvents, such as $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiSbF_6$, $LiAlO_4$, $LiAlCl_4$, $LiN(C_xF_{2x+1}SO_2)(C_yF_{2y+1}SO_2)$ where x and y are natural numbers, and mixtures thereof.

As shown in FIG. 5, the separator 4 is positioned between the cathode electrode 3 and the anode electrode 2 to form the electrode assembly. The electrode assembly is wound or folded and then sealed in a cylindrical or rectangular battery case 5. Then, the electrolyte solution is injected into the battery case 5, and the case 5 is sealed with a cap assembly 6 to complete a lithium ion battery.

Alternatively, electrode assemblies may be stacked upon one another to form a bi-cell structure which is then immersed in a non-aqueous electrolytic solution and sealed in a pouch to form a lithium ion polymer battery.

According to one embodiment of the present invention, a method of preparing the anode active material comprises mixing a metal active material powder, fibrous metallic particles and a carbonaceous precursor to obtain a mixture, pulverizing the resultant mixture, and then calcining the pulverized mixture. In one embodiment, the mixture is mechanically pulverized, thereby further grinding the metal active material powder into ultra-fine particles. This obtains a homogenized mixture and reduces volumetric changes during repetitive charging and discharging cycles. The carbonaceous precursor, such as a polymeric material, is carbonized by calcining the pulverized mixture. The calcined mixture is a conductive carbonaceous coating layer that is coated on and bonds with the metal active material powder and the fibrous metallic particles to obtain an anode active material according to one embodiment of the present invention.

In one embodiment of the present invention, the metal active material powder used in the preparation of the anode active material comprises a metal capable of alloying with lithium. Nonlimiting examples of suitable metals include Si, Sn, Al, Ge, Pb, Bi, Sb, and combinations thereof. However, it is understood that any metals known in the art may be used.

In another embodiment of the present invention, the carbonaceous precursor comprises a resin selected from vinyl-based resins, phenol-based resins, cellulose-based resins, pitch-based resins, tar-based resins, and combinations thereof. However, it is understood that any polymer may be used as long as it can be calcined into a carbonaceous material by heat treatment.

Nonlimiting examples of suitable techniques for pulverizing include high-energy milling, mechano-fusion, ball milling or hammer milling. However, any other pulverizing method can be used as long as it can pulverize the metallic powder particles into finer particles and can homogenize the polymeric material and the metallic powder particles.

In one embodiment, the calcining temperature ranges from about 500 to about 1400° C. In another embodiment, the calcining temperature ranges from about 700 to about 1000° C. If the calcining temperature exceeds about 1400° C., the high temperature particle shapes may deform. If the calcining temperature is lower than about 500° C., volumetric changes may not be adequately suppressed.

In one embodiment of the present invention, the mixing ratio of the materials of the anode active material is adjusted such that the fibrous metallic particles are present in an amount ranging from about 0.01 to about 20 parts by weight based on the total weight of the metal active material powder, and the carbonaceous precursor is present in an amount ranging from about 0.1 to about 20 parts by weight based on the total weight of the metal active material powder. If the amount of the fibrous metallic particles in the mixture exceeds about 20 parts by weight, the capacity per weight of the anode active material may decrease. If the amount of fibrous metallic particles is less than about 0.01 parts by weight, suppression of volumetric changes may be noticeably reduced. In addition, if the amount of the carbonaceous precursor in the mixture is less than about 0.1 parts by weight, the suppression of volumetric changes attributable to the carbonaceous coating layer may be noticeably reduced. If the amount of the carbonaceous precursor exceeds about 20 parts by weight, the electrical capacity per weight of the anode active material may decrease.

Certain embodiments of the present invention are illustrated by the examples given below. These examples are illustrative only and are not intended to limit the scope of the invention.

EXAMPLES

Preparation of Fibrous Metallic Particles

Example 1

Figure 1:
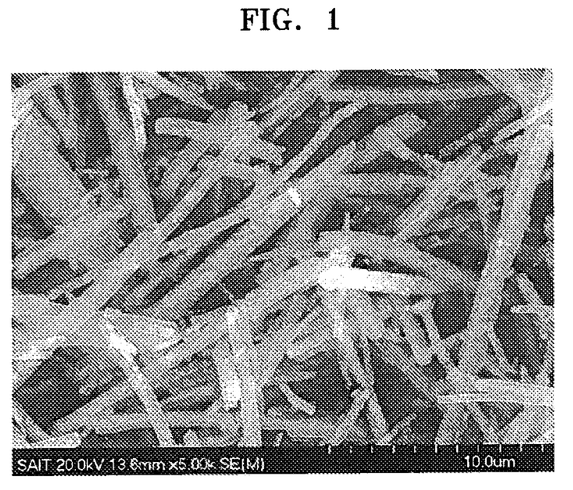
FIG. 1 is an Scanning Electron Microscope (SEM) image of fibrous carbon-cobalt composite particles prepared according to Example 1.

19 g of cobalt acetate tetrahydrate and 10 g of trimesic acid were dissolved in 1000 mL distilled water and agitated at room temperature for 10 hours. Then, the obtained powder was filtered using a nylon filter, washed several times, and dried in an oven at 80° C. for 12 hours to obtain fibrous coordinate polymer particles. The obtained fibrous coordinate polymer particles were subjected to heat treatment under a flow of argon gas at 900° C. for 10 hours, thereby preparing fibrous carbon-cobalt composite particles. FIG. 1 is a Scanning Electron Microscope (SEM) image of the fibrous carbon-cobalt composite particles prepared according to Example 1.

Preparation of Anode Active Material

Example 2

1 g of metallic silicon powder having an average particle diameter smaller than 43 μm, 0.05 g of the fibrous carbon-cobalt composite particles prepared in Example 1, and 1 g of polyvinyl alcohol (PVA) powder having a number average molecular weight of 500 were mixed, and pulverized for 30 minutes using a high-energy mechanical milling machine (e.g. SPEX 8000M device commercially available from SPEX CertiPrep Inc.). 0.05 g of carbon-cobalt composite particles were mixed in to the pulverized product, and the PVA of the resultant product was then completely carbonized by subjecting the resultant product to heat treatment under a flow of argon gas at 900° C. for 10 hours, thereby preparing the anode active material.

Figure 2:
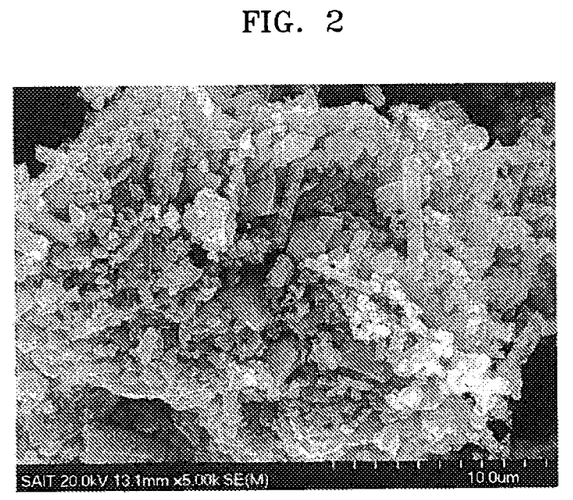
FIG. 2 is an SEM image of an anode active material prepared in Example 2 of the present invention.

FIG. 2 is a SEM image of the anode active material prepared according to Example 2. The anode active material was found to have three-dimensional irregular arrays of metallic silicon powder and fibrous carbon-cobalt composite particles, as confirmed by the SEM image in FIG. 2. The metallic silicon powder and fibrous carbon-cobalt composite particles are present in the anode active material in a state in which they are bonded to and coated by a carbonaceous material. Silicon particles in the anode active material have various, irregular morphologies, such as spheres, polygons, and so on, which are thought to be due to the breaking or deformation of the metal core in the course of pulverizing and calcining.

Comparative Example 1

1 g of metallic silicon powder having an average particle diameter smaller than 43 μm, and 1 g of polyvinyl alcohol (PVA) powder having a number average molecular weight of 500 were mixed and pulverized for 50 minutes using a high-energy mechanical milling machine (e.g. SPEX 8000M device commercially available from SPEX CertiPrep Inc.). The pulverized product was subjected to heat treatment under a flow of argon gas at 900° C. for 10 hours to completely carbonize the PVA, and the resultant product was further pulverized, thereby preparing an anode active material.

Figure 3:
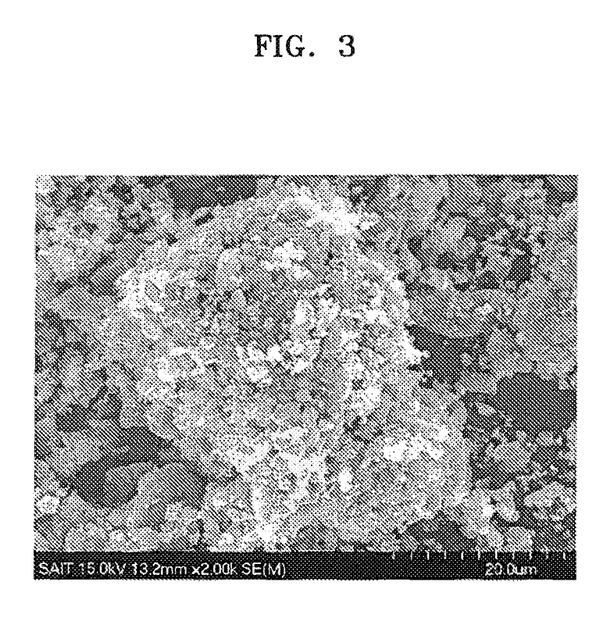
FIG. 3 is a SEM image of an anode active material prepared according to Comparative Example 1.

FIG. 3 is a SEM image of the anode active material prepared according to Comparative Example 1. Referring to FIG. 3, the anode active material has silicon particles dispersed therein without fibrous metallic particles, suggesting that they are electrically isolated from one another.

Preparation of Anode

Example 3

3.3 g of the powder obtained by pulverizing the anode active material prepared according to Example 2 using a mortar and pestle, 5.7 g of graphite powder having an average particle diameter of 2 μm, and 20 g (5 wt %) of polyvinylidene difluoride (PVdF) were mixed. 5 mL N-methylpyrrolidone (NMP) was added to the mixture, and then the resultant product was stirred using a mechanical agitator for 60 minutes, thereby preparing a slurry.

The slurry was coated on a copper (Cu) current collector to a thickness of about 200 μm using a doctor blade, dried, and then dried again under vacuum at 110° C., thereby preparing an anode.

Comparative Example 2

An anode was prepared as in Example 3, except that the anode active material was prepared by mixing 3 g of powder obtained by pulverizing the anode active material prepared according to Comparative Example 1 using a mortar and pestle with 0.3 g of the fibrous carbon-cobalt composite particles prepared according to Example 1.

Comparative Example 3

An anode was prepared as in Example 3, except that the anode active material was prepared by mixing 3 g of powder obtained by pulverizing the anode active material prepared according to Comparative Example 1 using a mortar and pestle with 0.6 g of the fibrous carbon-cobalt composite particles prepared according to Example 1.

Preparation of Lithium Battery

Example 4

A 2015 size coin cell was prepared using the anode prepared according to Example 3, metallic lithium as a counter electrode, a polytetrafluoroethylene (PTFE) separator, and an electrolytic solution containing 1M $LiPF_6$ as a lithium salt dissolved in a mixture of ethylene carbonate (EC) and dimethyl carbonate (DEC) in a mixing ratio of 3:7 vol %.

Comparative Example 4

A 2015 size coin cell was produced as in Example 4 except that the anode prepared according to Comparative Example 2 was used.

Comparative Example 5

A 2015 size coin cell was produced as in Example 4 except that the anode prepared according to Comparative Example 3 was used.

Charge-Discharge Cycle Tests

Figure 4:
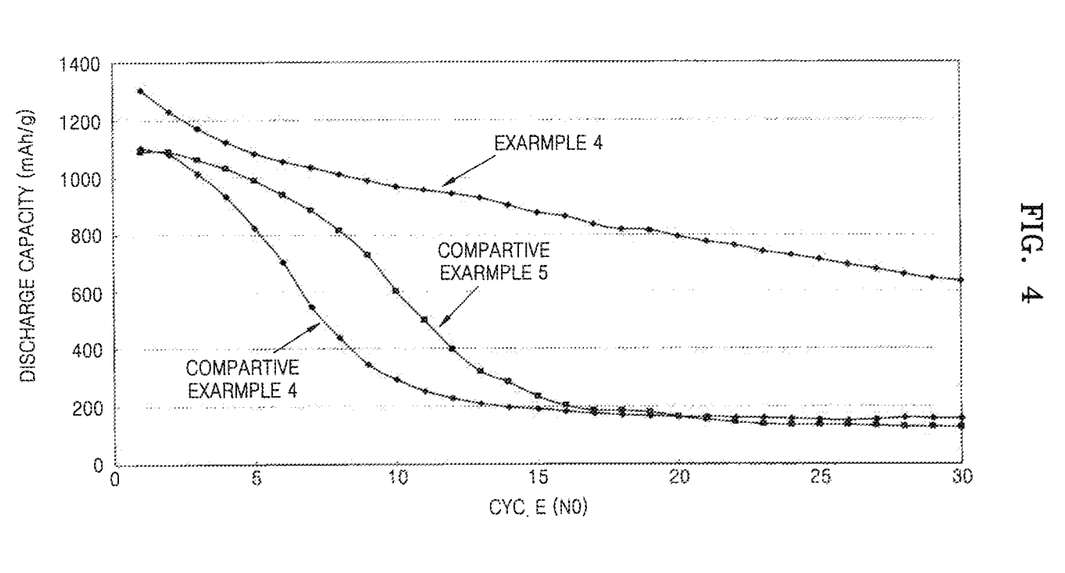
FIG. 4 is a graph of the initial charge-discharge capacities of the lithium batteries prepared according to Example 4 and Comparative Examples 4 and 5.

The coin cells prepared in Example 4 and Comparative Examples 4 and 5 were evaluated using a charge-discharge cycle test at a rate of 0.1 C. Results of this testing are shown in FIG. 4. The initial efficiencies and charge-discharge capacities of the lithium batteries are shown in Table 1.

TABLE 1

|  | Initial Efficiency | Charge capacity (mAh/g) | Discharge capacity (mAh/g) |
| --- | --- | --- | --- |
| Example 4 | 86% | 1278 | 1103 |
| Comparative Example 4 | 87% | 1243 | 1092 |
| Comparative Example 5 | 87% | 1491 | 1303 |

As shown in Table 1 and FIG. 4, the initial efficiency of the coin cell prepared according to Example 4 was substantially the same as that of each of the coin cells prepared according to Comparative Examples 4 and 5. However, the capacity retention ratio after 30 cycles of the coin cell prepared according to Example 4 was about 50%, whereas the coin cells prepared according to Comparative Examples 4 and 5 were not greater than 20%. In other words, after repeating 10 to 15 discharge cycles, the coin cell prepared according to Example 4 did not show an appreciable reduction in charge-discharge efficiency, whereas the coin cells prepared according to Comparative Examples 4 and 5 showed a drastic reduction in discharge capacity.

As is apparent from the results, the coin cell prepared in Example 4 exhibits a relatively high capacity retention ratio. This is thought to be due to a suppressed volumetric expansion of active material particles which include a carbonaceous material bonded to and coated on metal active material particles and fibrous metallic particles, which also avoids the generation of cracks. In addition, the high capacity retention of the coin cell prepared according to Example 4 can also be attributed to the anode active material maintaining its electric conductivity without being electrically isolated due to the fibrous metallic particles.

In one embodiment of the present invention, an anode active material comprises a carbonaceous material capable of improving battery cycle characteristics by bonding to and coating the metal active material particles and fibrous metallic particles to suppress volumetric changes and prevent electrode deterioration. This is accomplished using the pores of the carbonaceous material.

While certain exemplary embodiments of the present invention have been described and illustrated, those of ordinary skill in the art will understand that various modifications and changes to the described embodiments can be made without departing from the spirit and scope of the present invention as defined in the appended claims.

What is claimed is:

1. An anode active material comprising a composite anode active material comprising:
    metal active material particles consisting of a metal selected from the group consisting of Si, Ge, and combinations thereof;
    fibrous carbon-metallic composite particles consisting essentially of carbon and a metal selected from the group consisting of Co, Ag, Ti, Zn, Mo, W, Mn, Cr, and combinations thereof; and
    a carbonaceous material coated on and bonded to the metal active material particles and the fibrous carbon-metallic composite particles.

2. The anode active material of claim 1, wherein an aspect ratio of the fibrous carbon-metallic composite particles ranges from about 1:2 to about 1:200.

3. The anode active material of claim 1, wherein a specific resistance of the fibrous carbon-metallic composite particles is less than about $20 \times 10^{-8}$ Ωm.

4. The anode active material of claim 1, wherein the fibrous carbon-metallic composite particles have an average particle diameter of less than 1000 nm.

5. The anode active material of claim 1, wherein the fibrous carbon-metallic composite particles have a shape selected from the group consisting of rods and tubes.

6. The anode active material of claim 1, wherein the carbonaceous material is prepared by carbonizing a resin selected from the group consisting of vinyl-based resins, phenol-based resins, cellulose-based resins, pitch-based resins, tar-based resins, and combinations thereof.

7. An anode electrode comprising the anode active material of claim 1.

8. A lithium battery comprising the anode electrode of claim 7.

9. The anode active material of claim 1, wherein the fibrous carbon-metallic composite particles consist essentially of carbon and a metal selected from the group consisting of Co, Ti, Zn, Mo, W, Mn, Cr, and combinations thereof.

10. A method of preparing the anode active material of claim 1, the method comprising:
    mixing a metal active material powder, fibrous carbon-metallic composite particles and a carbonaceous material precursor to obtain a mixture;
    pulverizing the mixture to prepare a pulverized mixture; and
    calcining the pulverized mixture.

11. The method of claim 10, wherein the carbonaceous material precursor comprises a resin selected from the group consisting of vinyl-based resins, phenol-based resins, cellulose-based resins, pitch-based resins, tar-based resins and combinations thereof.

12. The method of claim 10, wherein the pulverizing the mixture comprises a technique selected from the group consisting of high-energy milling, mechano-fusion, ball milling, hammer milling and combinations thereof.

13. The method of claim 10, wherein the calcining the pulverized mixture comprises heat-treating the pulverized mixture at a calcination temperature ranging from about 500 to about 1400° C.

14. The method of claim 10, wherein the fibrous carbon-metallic composite particles are present in the anode active material in an amount ranging from about 0.01 to about 20 parts by weight based on the weight of the metal active material powder, and the carbonaceous precursor is present in the anode active material in an amount ranging from about 0.1 to about 20 parts by weight based on the weight of the metal active material powder.

15. A lithium battery comprising:
a cathode;
an anode comprising a composite anode active material comprising:
  metal active material particles consisting of a metal selected from the group consisting of Si, Ge, and combinations thereof;
  fibrous carbon-metallic composite particles consisting essentially of carbon and a metal selected from the group consisting of Co, Ag, Ti, Zn, Mo, W, Mn, Cr, and combinations thereof; and
  a carbonaceous material coated on and bonded to the metal active material particles and the fibrous carbon-metallic composite particles; and
a separator positioned between the cathode and anode.

16. The lithium battery of claim 15, wherein an aspect ratio of the fibrous carbon-metallic composite particles ranges from about 1:2 to about 1:200.

17. The lithium battery of claim 15, wherein a specific resistance of the fibrous carbon-metallic composite particles is less than about $20 \times 10^{-8}$ $\Omega$m.

18. The lithium battery of claim 15, wherein the fibrous carbon-metallic composite particles have an average particle diameter of less than 1000 nm.

19. The lithium battery of claim 15, wherein the fibrous carbon-metallic composite particles consist essentially of carbon and a metal selected from the group consisting of Co, Ti, Zn, Mo, W, Mn, Cr, and combinations thereof.

* * * * *